US008843962B2

(12) United States Patent
Kritt et al.

(10) Patent No.: US 8,843,962 B2
(45) Date of Patent: Sep. 23, 2014

(54) TELEVISION PROGRAM GUIDE INTERFACE FOR THE PRESENTATION AND SELECTION OF SUBDIVISIONS OF SCHEDULED SUBSEQUENT TELEVISION PROGRAMS

(75) Inventors: Barry A Kritt, Austin, TX (US); Thomas S Mazzeo, Austin, TX (US); Sarbajit K Rakshit, Kolkata (IN)

(73) Assignee: International Business Machine Corporation, Armonk, NY (US)

( * ) Notice: Subject to any disclaimer, the term of this patent is extended or adjusted under 35 U.S.C. 154(b) by 402 days.

(21) Appl. No.: 13/098,659

(22) Filed: May 2, 2011

(65) Prior Publication Data
US 2012/0284750 A1 Nov. 8, 2012

(51) Int. Cl.
- H04N 21/462 (2011.01)
- H04N 21/431 (2011.01)
- H04N 21/472 (2011.01)
- H04N 21/4545 (2011.01)

(52) U.S. Cl.
CPC ....... *H04N 21/4314* (2013.01); *H04N 21/4622* (2013.01); *H04N 21/45457* (2013.01); *H04N 21/47214* (2013.01)
USPC ................. 725/41; 725/51; 725/52; 725/61

(58) Field of Classification Search
CPC .............................................. H04N 21/47214
USPC ...................................... 725/37–61
See application file for complete search history.

(56) References Cited

U.S. PATENT DOCUMENTS

| | | | | |
|---|---|---|---|---|
| 5,805,733 | A * | 9/1998 | Wang et al. | 382/232 |
| 7,197,758 | B1 * | 3/2007 | Blackketter et al. | 725/37 |
| 2005/0097621 | A1 | 5/2005 | Wallace et al. | |
| 2008/0046928 | A1 | 2/2008 | Poling et al. | |
| 2008/0046932 | A1 | 2/2008 | Stallings et al. | |
| 2008/0101773 | A1 | 5/2008 | Park et al. | |
| 2009/0133060 | A1 * | 5/2009 | Barrett et al. | 725/37 |
| 2010/0095329 | A1 * | 4/2010 | Tran et al. | 725/61 |
| 2010/0154000 | A1 | 6/2010 | Macrae et al. | |
| 2010/0205628 | A1 | 8/2010 | Davis et al. | |
| 2010/0333143 | A1 | 12/2010 | Civanlar et al. | |
| 2012/0144430 | A1 * | 6/2012 | Steele et al. | 725/55 |

OTHER PUBLICATIONS

*Video summarization based on the psychological content in the track structure*, T. Moriyama et al., ACM Multimedia Workshop, Marina Del Rey, CA, USA, Copyright ACM 2000 1-58113-311-1-/00/11, p. 191.

*Video Snapshot: A Bird View of Video Sequence*, Yu-Fei Ma et al., Proceedings of the 11th International Multimedia Modelling Conference (MMM'05), 1550-5502/05, IEEE 2005.

* cited by examiner

*Primary Examiner* — Bennett Ingvoldstad
(74) *Attorney, Agent, or Firm* — J. B. Kraft; Steven L. Bennett (57) ABSTRACT

A viewer who is consulting a television programming guide with additional information that involves a comprehensive set of visual images. Preferably, the set of sequential images are stills or snapshots representative of portions of the television program.

14 Claims, 6 Drawing Sheets

TELEVISION PROGRAM GUIDE INTERFACE FOR THE PRESENTATION AND SELECTION OF SUBDIVISIONS OF SCHEDULED SUBSEQUENT TELEVISION PROGRAMS

TECHNICAL FIELD

The present invention relates to computer controlled television programming and, particularly, to the presentation of program guides listing subsequent television programs from which viewers may select subsequent or future television for viewing or recording under computer control, usually in the form of a television set top box.

BACKGROUND OF RELATED ART

The computer controlled set top box is usually connected to a provider/subscriber television system. The box contains the computer resources necessary to control the television program presentation on a typical television set or personal computer. Of course, all of the computer resources needed to control the television or personal computer display may be integrated into the television set, the personal computer or mobile device, such as a cellular telephone or personal digital assistant (PDA).

Figure 1:
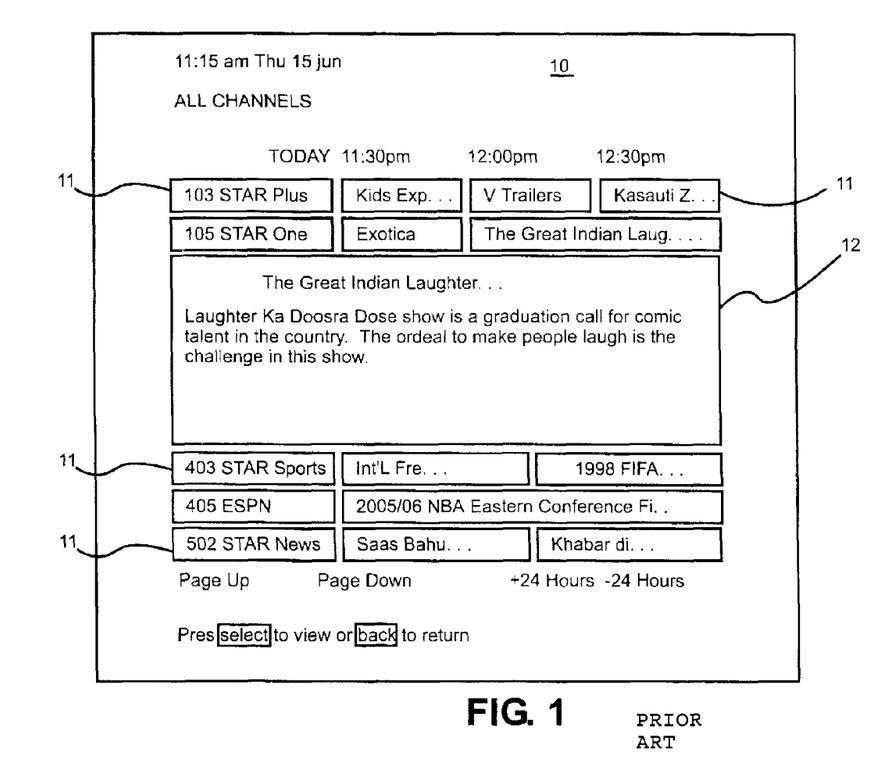
FIG. 1 is a generalized view of a displayed program guide illustrating a standard textual synopsis of a listed television program upon viewer selection for more information.

Television programming provided by the service provider often run into the hundreds of television programs available from hundreds of channels for any given time period. On-screen program guides have provided reasonable organization for the hundreds of television programs being offered. As shown in FIG. 1, these programming guides have a scrollable vertical list of channels, each having a row of sequential time segments with each segment representing a television program scheduled for the time segment. Should the viewer desire more information about the television program in a particular time segment, the viewer may select or "click" on the listing for the television program and receive more information in the form of a synopsis, e.g. item 12, FIG. 1. This synopsis gives very limited information to the viewer. Often, this synopsis provides insufficient information to help the viewer decide between what may be several television program offerings that are of interest.

SUMMARY OF THE PRESENT INVENTION

The present invention provides the viewer, who is consulting the programming guide, with additional information that involves a comprehensive set of visual images. Preferably, the set of sequential images are stills or snapshots representative of portions of the television program.

Accordingly, the present invention provides a method for selecting segments of listed television programs in a displayed television scrollable program guide that comprises displaying a scrollable program guide having a vertical list of channels, each having a row of sequential future time segments, each segment representing a television program scheduled for the future time segment and enabling a viewer to select a segment in a channel sequence, wherein the television program represented by said segment will be shown at the scheduled future time.

In this environment, this invention provides for the display of one or more of said future time segments wherein each includes a sequence of still images in the represented television program with each still image representing a sequential point in the television program. The viewer is, thus, enabled to select one of the still images in the sequence of still images, wherein the television portion at the sequential point represented by the still image will be shown at the scheduled future time of the sequential point. The still images may be stills of video scenes in the portions of the programs represented by the stills.

In accordance with an aspect of the invention, a viewer will be enabled to select a portion of the television program for recording at said scheduled future time of said sequential point.

Provision may be made for enabling the viewer to select a still image to get further advance information about the program portion represented by the still image. This information may be in the same form as a conventional textual synopsis provided for the whole television program, but will just cover the portion represented by the still image.

In accordance with a significant aspect of the invention, the sequence of still images is in the form of a film strip of the video. The images in the strip may vary in length relative to the variations in length of the portions represented' by the images or frames in the strip.

DETAILED DESCRIPTION OF THE PREFERRED EMBODIMENT

DETAILED DESCRIPTION OF THE PREFERRED EMBODIMENT

Referring to FIG. 1, there is shown a generalized diagrammatic view of a displayed program guide 10 that may be presented on a television set or any personal computer display on which a television program may be viewed. The standard guide is a matrix wherein the scheduled television programs are shown in horizontal rows 11 representative of television channels. When a viewer wishes more information about a particular program, the viewer scrolls to the program scheduled at a particular time and usually clicks on an information button resulting in the display of textual synopsis 12.

Figure 2:
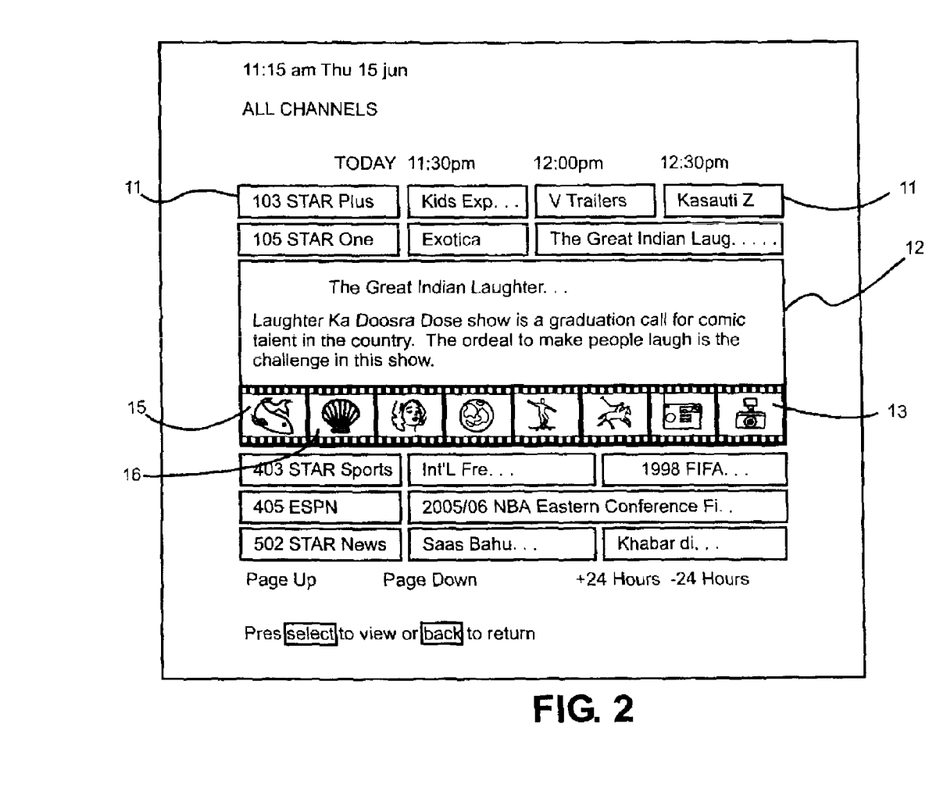
FIG. 2 is the same generalized view of FIG. 1 with the addition of the video film strip in accordance with the present invention.

In the present invention, as shown in FIG. 2, there is provided a film frame strip 13 of sequential still images from the television program content at sequential points in the program. Each frame 14 or 16 represents a portion of the television program at the frame point in the television program sequence. The viewer is, thus, provided with visual information that supplements the synopsis 12. The viewer then has the option of selecting the entire television program for subsequent viewing or recording, or he may only select one or more of the television program portions represented by any of the frames in the film strips for future viewing or recording. As will be hereinafter described in greater detail, these film strips may conveniently be provided by the television service provider.

Figure 3:
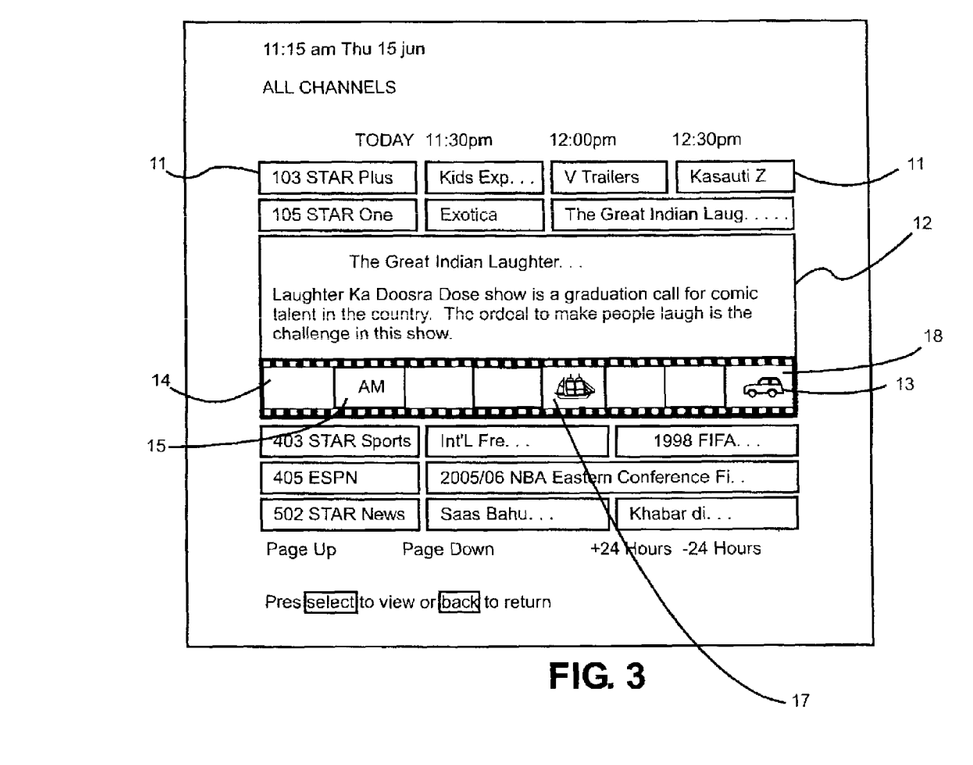
FIG. 3 is the view of FIG. 2 wherein three (3) stills in the strip have been selected for future viewing or recording.

By way of example, for a typical one hour television program, a film strip of eight (8) snapshots or frames may be used. Thus, each frame may represent 7.5 minutes of the hour. This gives the viewer the option of selecting only some of the frames for subsequent viewing or recording. In FIG. 3, the viewer has selected frames 15, 17 and 18 in film strip 13 for such subsequent viewing or recording. Accordingly, the portion or segment of the television program represented by frames 15, 17 and 18 will be subsequently viewed or recorded. It should be noted that while in this example, the television program segments represented by the frames in the strip have been of equal length, the segments need not be equal. This may be determined by the service provider sending the representative film strips to the viewers.

Figure 6:
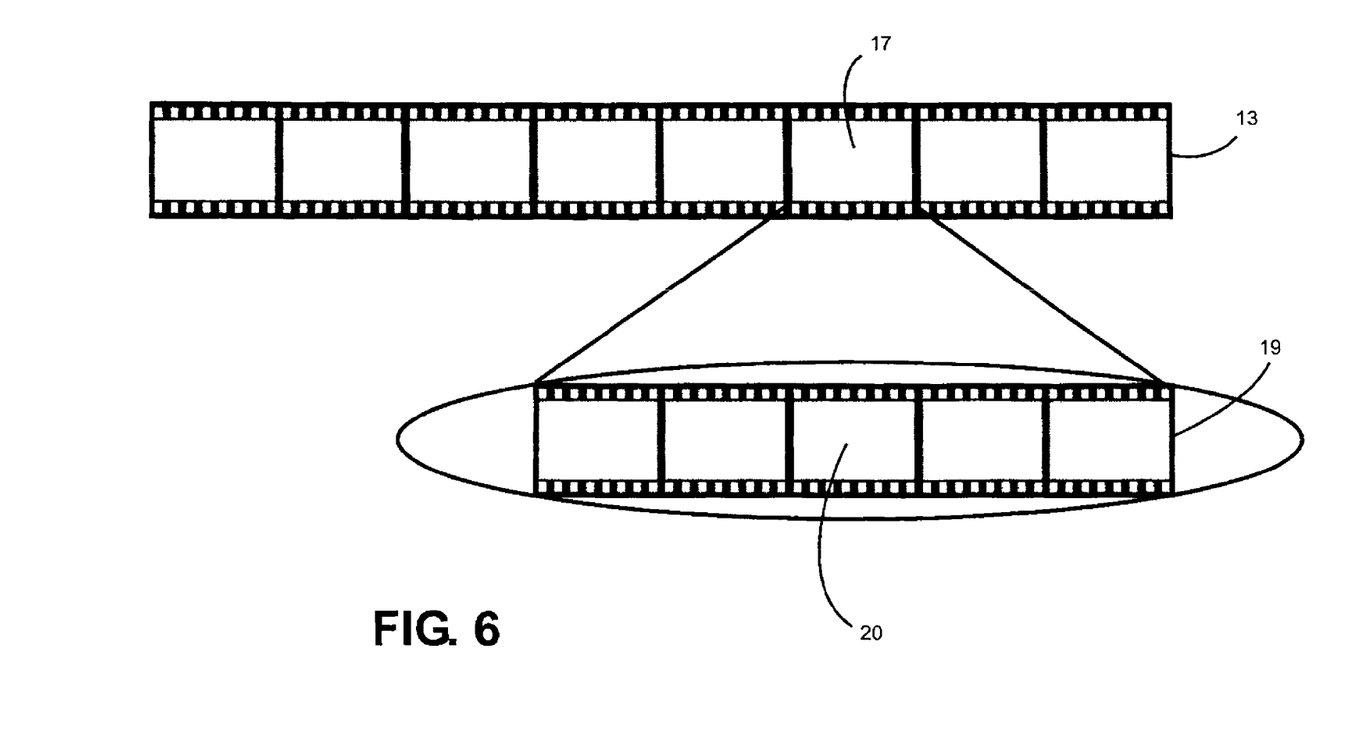
FIG. 6 is a diagrammatic illustration of an aspect of the present invention wherein there is displayed a sub-strip having a sequence of sub-images within the portion of the television program represented by a selected image in an initial film strip.

In a further aspect of the present invention, reference is made to FIG. 6, which is a diagrammatic illustration of an aspect of the present invention wherein there is displayed a sub-strip having a sequence of sub-images within the portion of the television program represented by a selected image in an initial film strip. It may be the case, particularly with television programming that runs for several hours that each frame 17 in the initial film strip 13 may be set up so as to be further dividable into a sub film strip 19 wherein each frame 20 represents a segment of the portion of the television program represented by frame 17. Like the initial film strips 13, the sub film strips are set up and stored in the server of the service provider and are made available by the service provider as required by the viewer. It should also be noted that the service provider may provide a textual synopsis for each frame 17, and sub frame 20.

Figure 4:
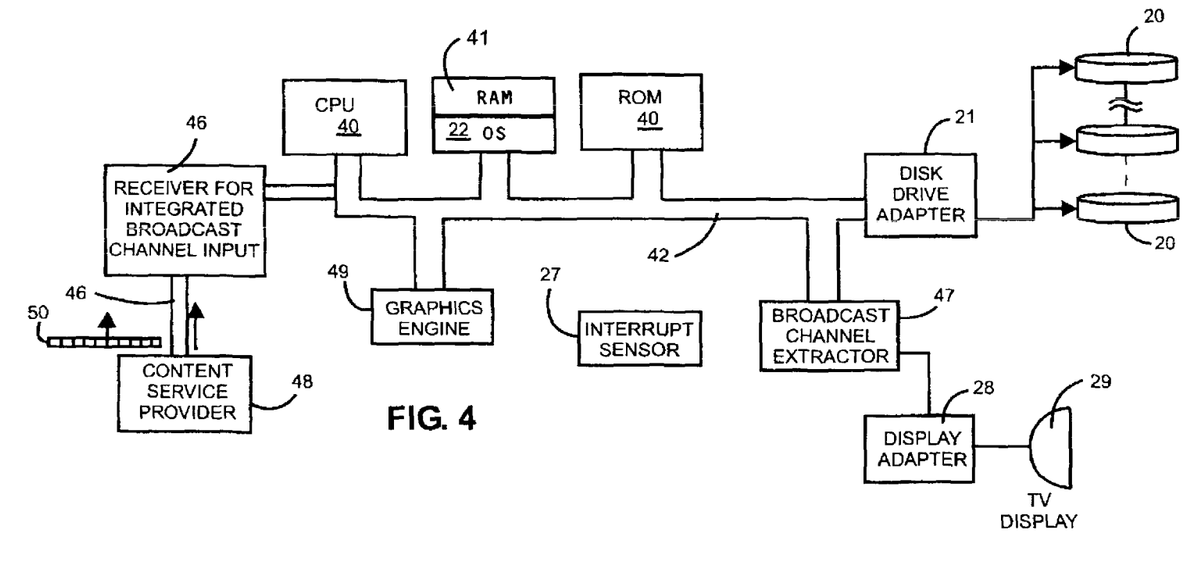
FIG. 4 is a generalized view of the computer controlled system of the present invention organized wherein the service provider provides the film strip of the television program content.
Figure 5:
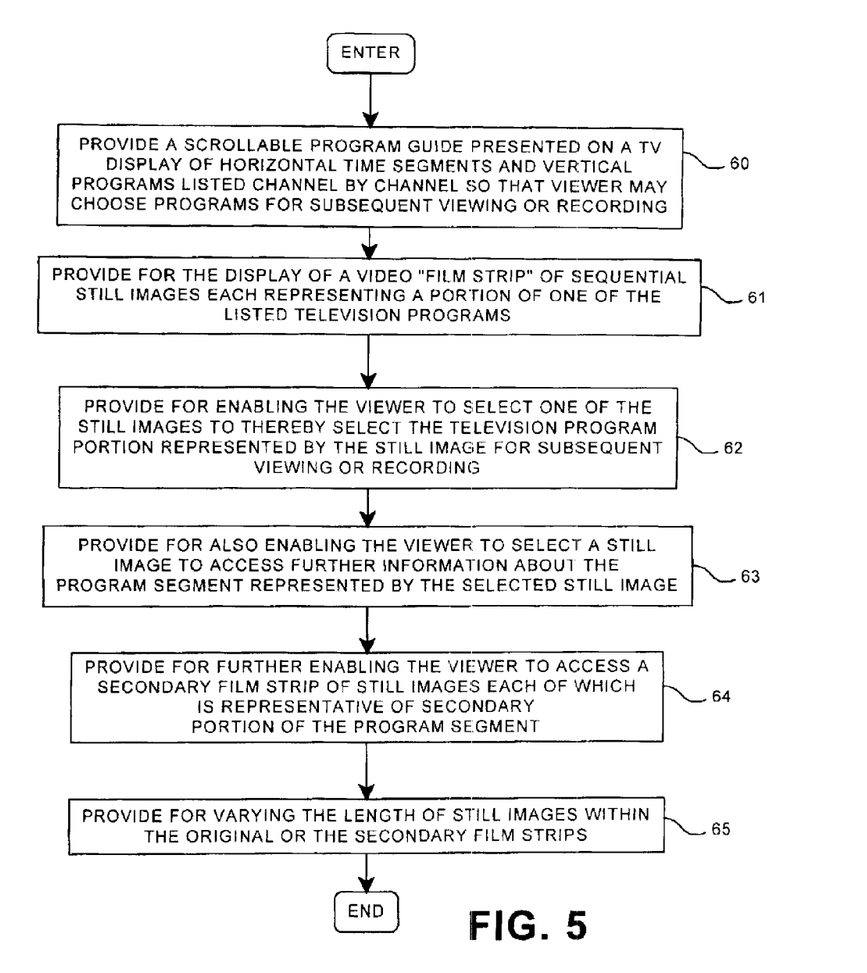
FIG. 5 is a flowchart describing how the implementation system of the present invention provides and implements the film strip of the television program content.

Now, with reference to FIG. 4 it will be described how the present invention may be implemented on any apparatus providing computer control of a television set so that the control programs of this invention may be operated with the equipment. The receiver 45 at the viewer's site receives the content input 46 from the service provider 48. The service provider also provides the above-described film strips 50. The apparatus shown connected to receiver 45 may be conveniently housed in a television set top box or integrated within a unitary television set.

The operations involved in the present invention are controlled by a data processing system under the control of a central processing unit 40, which, in turn, is interconnected to various other components by system bus 42. An operating system (OS) 22 that runs on processor 40 provides control and is used to coordinate the functions of the various components of the control system. The OS 22 is stored in Random Access Memory (RAM) 41. The control programs for the functions, including those for displaying film strips and sub-scripts, and enabling the viewer to select the portions and segments represented by the frames of film scripts and sub-scripts for future viewing on the television sets of the present invention may be permanently stored in Read Only Memory (ROM) 13 and moved into and out of RAM to perform their respective functions. In the normal operation for real-time television program playing, the integrated incoming data stream, under CPU control, is applied to broadcast channel extractor 47 that extracts the data representative of the television program scheduled for the channel that the user has selected on a tuner (not shown) and applies the extracted data to a conventional television display adapter 28 to be displayed on the user's television set 29.

When the incoming unitary data stream is to be recorded on a DVR, the signal is processed through a disk drive adapter 21 and stored on disk drives 20. In the conventional operation of a DVR, the television program scheduled for a given channel at a given time is extracted by extractor 17, in response to interrupt sensor and then stored on a disk drive 20 provided on the DVR. This individual program would be recorded and, thus, stored on the disk drive either in response to advance scheduling by the user for such a recording in accordance with the present invention based upon the selection of frames in the film strips and sub-strips.

Now, with reference to the programming shown in FIG. 4 there will be described how the system and programs of the present invention are set up. There is provided a scrollable standard program guide presented on a TV display of horizontal time segments and vertical programs listed channel by channel so that the viewer may choose programs for subsequent viewing or recording, step 60. Provision is then made for the display of a video "film strip" of sequential still images each representing a portion of one of the listed television programs, step 61. Provision is made for the viewer to select one of the still images to thereby select the television program portion represented by the still image for future viewing or recording, step 62. Provision is also made for enabling the viewer to select a still image to access further information about the program segment represented by the selected still image, step 63. Further provision is made for enabling the viewer to select a secondary film strip of still images, each of which is representative of a secondary portion of the program segment, step 64. In addition, provision may be made for varying the length of still images within the original or secondary films strips, step 65.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave.

Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A method for selecting segments of listed television programs in a displayed television scrollable program guide comprising:
    displaying a scrollable program guide having a list of channels, each having a row of sequential future time segments, each segment representing a television program scheduled for the future time segment;
    enabling a viewer to select a segment in a channel sequence, wherein the television program represented by said segment will be shown at the scheduled future time;
    displaying one or more of said future time segments, each including a sequence of still images in the represented television program in the form of a video film strip, each still images representing an initial image in a sequence of images of a portion of the television program at a sequential point in the television program;
    enabling the viewer to select one of the still images in said sequence of still images, wherein the television portion at said sequential point represented by said sill image will be shown at the scheduled future time of said sequential point;
    enabling the viewer to select one of the still images portion in said sequence of still images, wherein the television portion at said sequential point represented by said still image will be recorded at the scheduled future time of said sequential point; and
    enabling a viewer to select an image in said film strip to display a sub-strip having a sequence of sub-images within the portion of the television program represented by the selected image.

2. The method of claim 1, wherein said still images are stills of video scenes in said portions of television programs.

3. The method of claim 2, further including enabling the viewer to select a still image to get further advance information about the program portion represented by the still image.

4. The method of claim 3, wherein said further advance information is in the form of a textual synopsis of the program represented by the still image.

5. The method of claim 1 wherein the still images in the video film strip differ in length.

6. A computer controlled system for selecting segments of listed television programs in a displayed television scrollable program guide comprising:
    a processor; and a computer memory holding computer program instructions which when executed by the processor perform the method comprising:

displaying a scrollable program guide having a list of channels, each having a row of sequential future time segments, each segment representing a television program scheduled for the future time segment;

enabling a viewer to select a segment in a channel sequence, wherein the television program represented by said segment will be shown at the scheduled future time;

displaying one or more of said future time segments, each including a sequence of still images in the represented television program in the form of a video film strip, each still images representing an initial image in a sequence of images of a portion of the television program at a sequential point in the television program;

enabling the viewer to select one of the still images in said sequence of still images, wherein the television portion at said sequential point represented by said sill image will be shown at the scheduled future time of said sequential point;

enabling the viewer to select one of the still images portion in said sequence of still images, wherein the television portion at said sequential point represented by said still image will be recorded at the scheduled future time of said sequential point; and enabling a viewer to select an image in said film strip to display a sub-strip having a sequence of sub-images within the portion of the television program represented by the selected image.

7. The system of claim 6, wherein said still images are stills of video scenes in said portions of television programs.

8. The system of claim 7, wherein the performed method further includes enabling the viewer to select a still image to get further advance information about the program portion represented by the still image.

9. The system of claim 8, wherein said further advance information is in the form of a textual synopsis of the program represented by the still image.

10. The system of claim 6 wherein the still images in the video film strip differ in length.

11. A computer usable non-transitory storage medium having stored thereon a computer readable program for selecting segments of listed television programs in a displayed television scrollable program guide, wherein. the computer readable program when executed on a computer causes the computer to:

display a scrollable program guide having a list of channels, each having a row of sequential future time segments, each segment representing a television program scheduled for the future time segment;

enable a viewer to select a segment in a channel sequence, wherein the television program represented by said segment will be shown at the scheduled future time;

display one or more of said future time segments, each including a sequence of still images in the represented television program in the form of a video film strip, each still images representing an initial image in a sequence of images of a portion of the television program at a sequential point in the television program;

enable the viewer to select one of the still images in said sequence of still images, wherein the television portion at said sequential point represented by said sill image will be shown at the scheduled future time of said sequential point;

enable the viewer to select one of the still images portion in said sequence of still images, wherein the television portion at said sequential point represented by said still image will be recorded at the scheduled future time of said sequential point; and enable a viewer to select an image in said film strip to display a sub-strip having a sequence of sub-images within the portion of the television program represented by the selected image.

12. The computer usable storage medium of claim 11, wherein said still images are stills of video scenes in said portions of television programs.

13. The computer usable storage medium of claim 12, wherein the computer program when executed further causes the computer to enable the viewer to select a still image to get further advance information about the program portion represented by the still image.

14. The computer usable storage medium of claim 13, wherein said further advance information is in the form of a textual synopsis of the portion of the program represented by the still image.

* * * * *